(12) United States Patent
Smith

(10) Patent No.: US 8,456,819 B1
(45) Date of Patent: Jun. 4, 2013

(54) PERSONAL STORAGE DEVICE WITH CHARGING CAPABILITY

(76) Inventor: Brian Delynn Smith, Bainbridge Island, WA (US)

( * ) Notice: Subject to any disclaimer, the term of this patent is extended or adjusted under 35 U.S.C. 154(b) by 401 days.

(21) Appl. No.: 12/383,977

(22) Filed: Mar. 30, 2009

(51) Int. Cl.
H05K 7/14 (2006.01)

(52) U.S. Cl.
USPC .................................. 361/679.02; 312/223.1

(58) Field of Classification Search
USPC ............. 361/679.01, 679.02, 679.41, 679.56; 70/2–13, 63, 158–169; 312/223.1, 242, 245, 312/246
See application file for complete search history.

(56) References Cited

U.S. PATENT DOCUMENTS

| | | | |
|---|---|---|---|
| 3,342,407 A | 9/1967 | Hall | |
| 3,481,288 A | 12/1969 | Teleky | |
| 3,715,998 A | 2/1973 | Teleky | |
| 3,842,761 A | 10/1974 | Bloom | |
| 4,145,978 A | 3/1979 | Johnsen | |
| 4,261,464 A | 4/1981 | Maitland | |
| 4,262,607 A | 4/1981 | Krebs | |
| 4,304,188 A | 12/1981 | Gulbrandsen | |
| 4,457,240 A | 7/1984 | Hungerford | |
| 4,462,317 A | 7/1984 | Franko et al. | |
| 4,474,116 A | 10/1984 | Castenada | |
| 4,539,828 A | 9/1985 | Teleky | |
| 4,542,848 A | 9/1985 | Peters | |
| 4,573,332 A | 3/1986 | Ma | |
| 4,577,563 A | 3/1986 | Sidler | |
| 4,628,827 A | 12/1986 | Litter | |
| 4,926,762 A | 5/1990 | Paul | |
| 4,942,831 A | 7/1990 | Tel | |
| 4,977,764 A | 12/1990 | Runnials | |
| 4,987,836 A | 1/1991 | Owen | |
| 5,031,548 A | 7/1991 | Huguenin | |
| 5,228,319 A * | 7/1993 | Holley et al. | 70/58 |
| 5,235,920 A | 8/1993 | Hector | |
| D352,660 S | 11/1994 | Stribiak | |
| 5,372,415 A | 12/1994 | Tisbo et al. | |
| 5,400,960 A | 3/1995 | Jeffs | |
| D359,402 S | 6/1995 | Tisbo et al. | |
| 5,513,580 A | 5/1996 | Franks | |
| 5,531,082 A | 7/1996 | Wolk et al. | |
| 5,607,102 A | 3/1997 | Walsh et al. | |
| 5,621,387 A | 4/1997 | Phillips et al. | |
| D394,169 S | 5/1998 | Tisbo et al. | |
| 5,769,006 A | 6/1998 | Allaer | |
| 5,790,372 A * | 8/1998 | Dewey et al. | 361/679.58 |
| 5,845,980 A | 12/1998 | Fricano et al. | |

(Continued)

OTHER PUBLICATIONS

Horovitz, Laptops, tech toys drive rise in dorm room theivery; Wary students turn to footlockers, safes. (USA Today, Sep. 13, 2004, A1), USA.

Primary Examiner — Jayprakash N Gandhi
Assistant Examiner — Ingrid Wright
(74) Attorney, Agent, or Firm — Turocy & Watson, LLP

(57) ABSTRACT

One embodiment of a lightweight and durable storage device comprising; a main enclosure of rigid material with interior partitions (FIG. 18), a hingedly attached and lockable access door panel (210) (119), an infinitely designable cosmetic door cover (113), a means for securing the enclosure to a fixed surface (111), a self contained unit for charging electronic items stored inside the enclosure (1410), a means for exterior venting (218), an exterior attachment (114) and means for securing larger items outside the enclosure (1210), and a non-abrasive surface material (1810) applied to high use areas of the enclosure.

8 Claims, 18 Drawing Sheets

U.S. PATENT DOCUMENTS

| | | |
|---|---|---|
| 5,934,499 A | 8/1999 | van der Hoven |
| 6,006,558 A | 12/1999 | Peters |
| 6,044,776 A | 4/2000 | Alizade |
| 6,065,408 A | 5/2000 | Tillim |
| 6,075,693 A * | 6/2000 | Leman ............... 361/679.57 |
| 6,209,976 B1 | 4/2001 | Shear |
| 6,218,796 B1 * | 4/2001 | Kozlowski ............... 318/280 |
| D449,748 S | 10/2001 | Martin et al. |
| D459,611 S | 7/2002 | Lio et al. |
| 6,490,893 B1 | 12/2002 | Benion |
| 6,527,135 B1 | 3/2003 | Braun et al. |
| 6,591,555 B2 | 7/2003 | King et al. |
| 6,595,605 B1 | 7/2003 | Babcock et al. |
| 6,784,364 B2 | 8/2004 | Kochanski et al. |
| 6,793,299 B2 | 9/2004 | Newberry et al. |
| 6,971,728 B2 | 12/2005 | Tsai |
| 7,086,255 B2 | 8/2006 | Reason |
| D546,582 S | 7/2007 | Moloney |
| 7,278,695 B2 | 10/2007 | Fromme et al. |
| 7,305,858 B1 | 12/2007 | Wu |
| D567,234 S | 4/2008 | Cox et al. |
| D567,776 S | 4/2008 | Wells |
| 7,365,268 B2 | 4/2008 | Collins et al. |
| 7,401,482 B1 | 7/2008 | Shaw et al. |
| 7,445,300 B2 * | 11/2008 | Collins et al. ............ 312/249.8 |
| D582,255 S | 12/2008 | Turpault et al. |
| 8,084,992 B2 * | 12/2011 | Scheffy et al. ............... 320/114 |
| 2002/0148395 A1 | 10/2002 | Judge |
| 2002/0171338 A1 | 11/2002 | Wetterberg |
| 2003/0080655 A1 * | 5/2003 | Goldberg ................ 312/290 |
| 2003/0090364 A1 | 5/2003 | Cardinale et al. |
| 2003/0141840 A1 * | 7/2003 | Sanders ................... 320/107 |
| 2004/0154359 A1 | 8/2004 | Jakubowski |
| 2005/0011423 A1 | 1/2005 | Mercier |
| 2005/0103065 A1 * | 5/2005 | Dennis ................... 70/56 |
| 2005/0199628 A1 | 9/2005 | Van Handel et al. |
| 2006/0060114 A1 * | 3/2006 | Walker ................... 109/67 |
| 2008/0115703 A1 | 5/2008 | Villiger |
| 2008/0257233 A1 | 10/2008 | Pallo et al. |

* cited by examiner

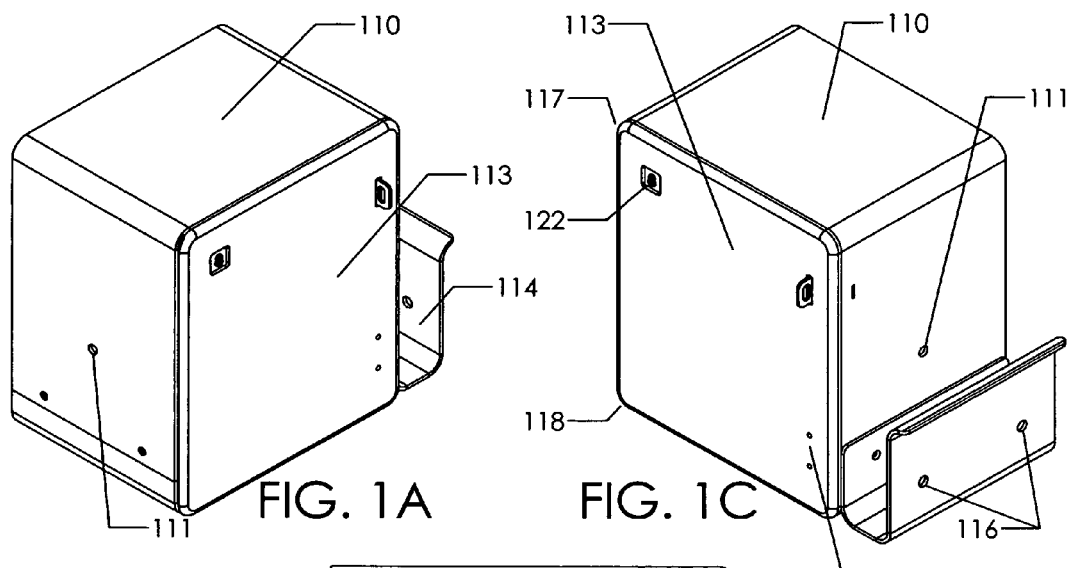
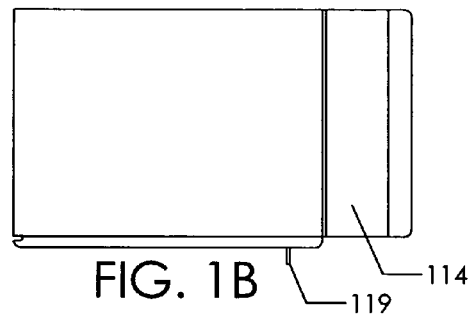
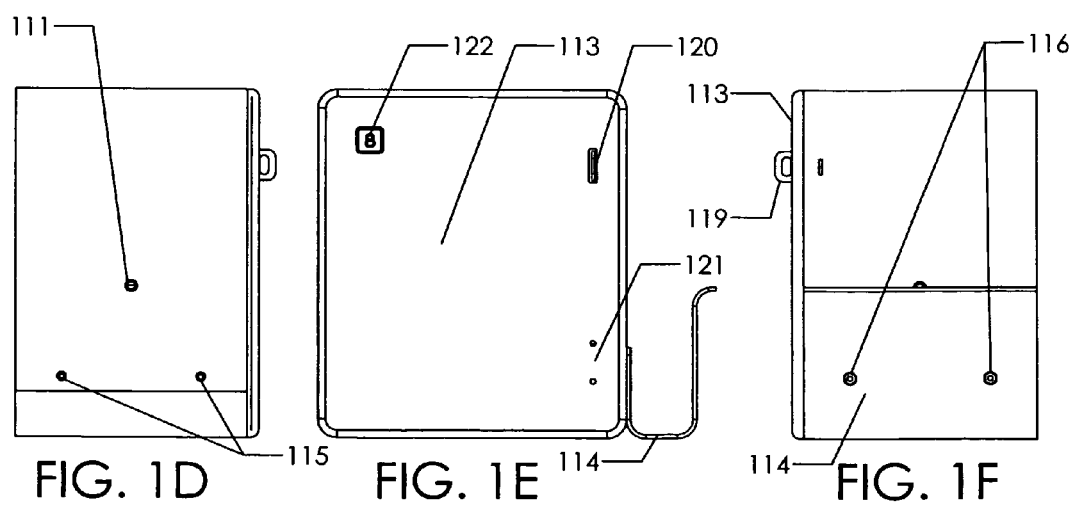

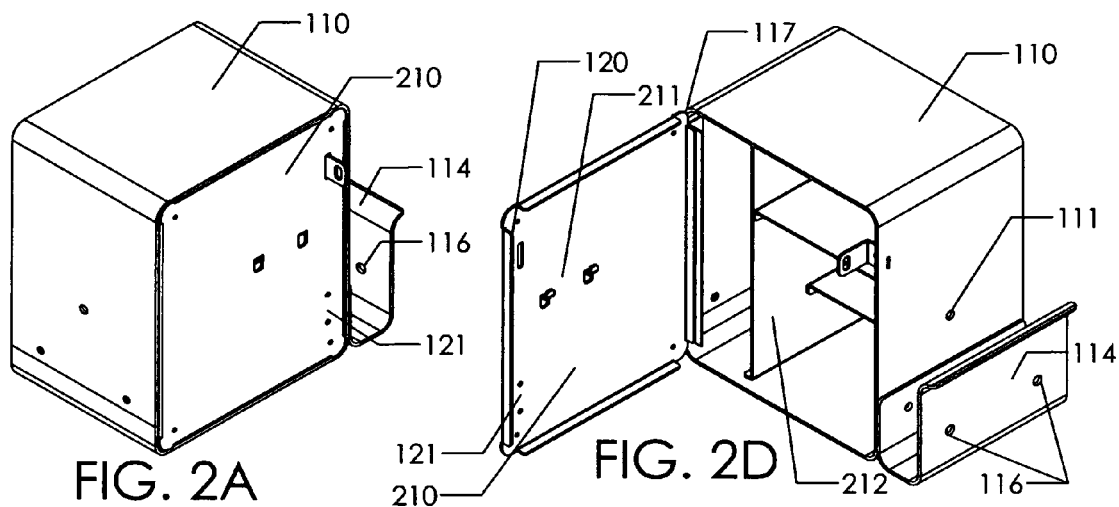
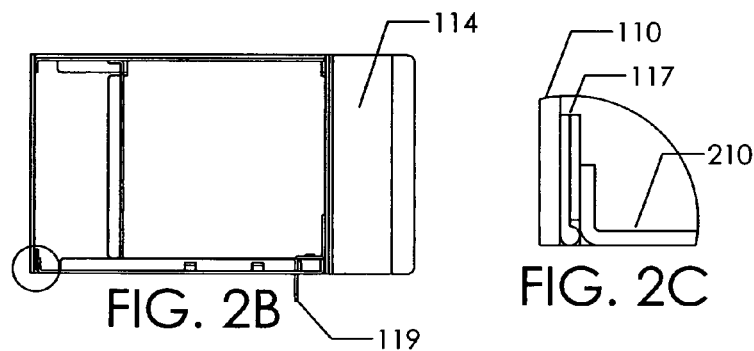
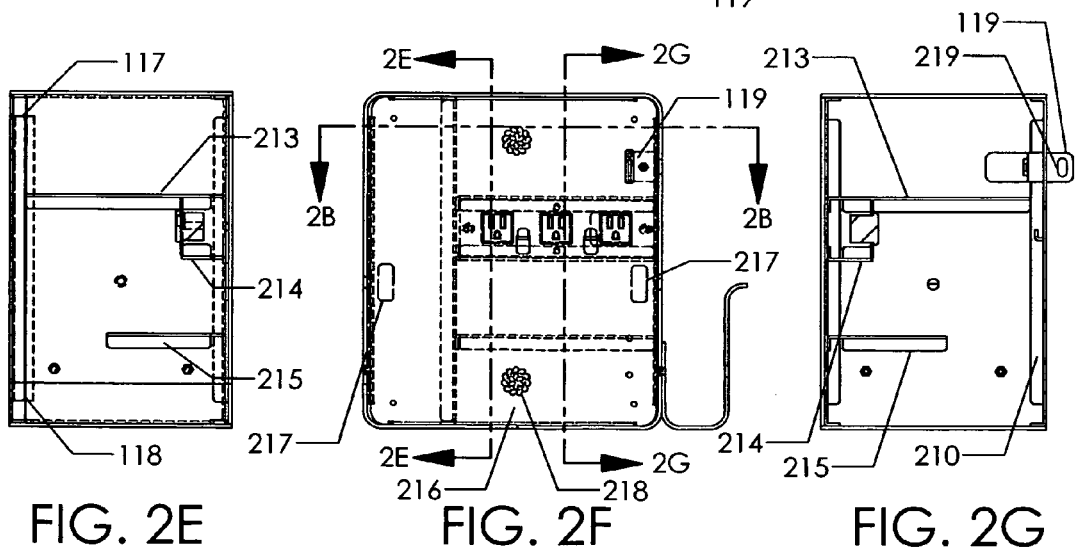
FIG. 2A  FIG. 2D  FIG. 2B  FIG. 2C  FIG. 2E  FIG. 2F  FIG. 2G

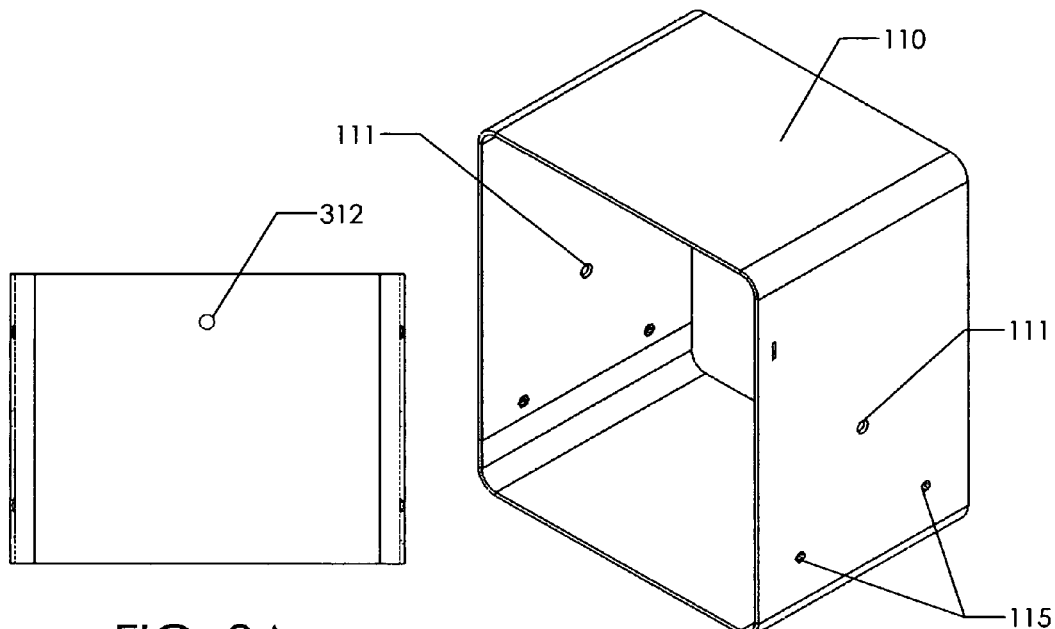
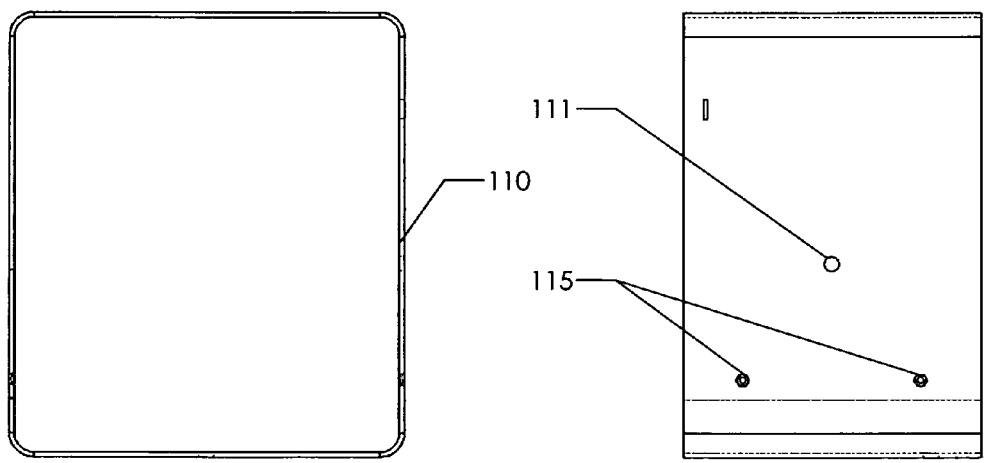
FIG. 3A  FIG. 3B
FIG. 3C  FIG. 3D

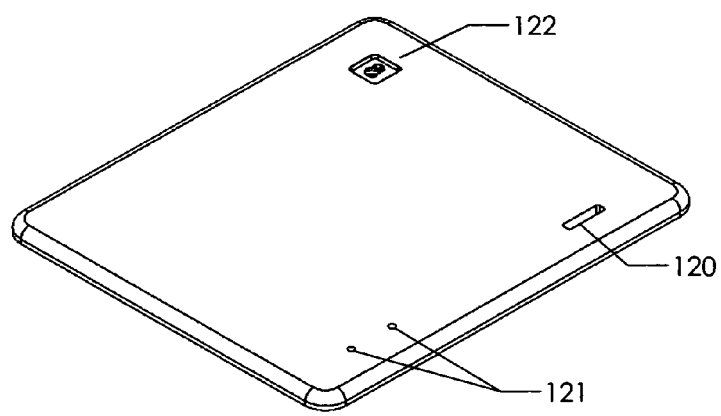
FIG. 5B
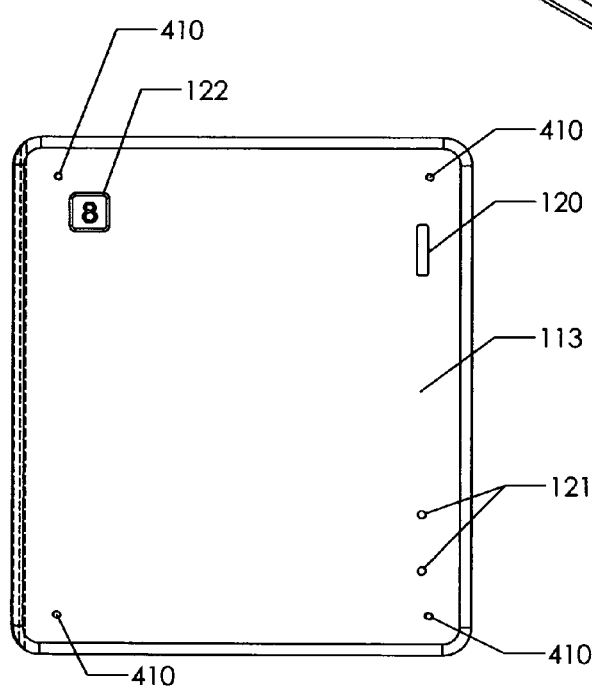
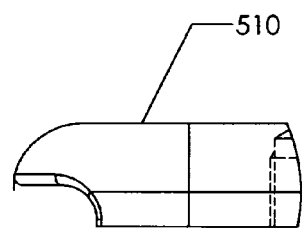
FIG. 5C
FIG. 5A
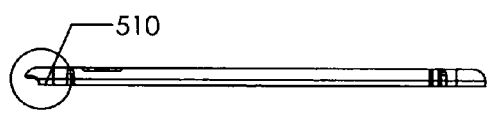
FIG. 5D
FIG. 5E

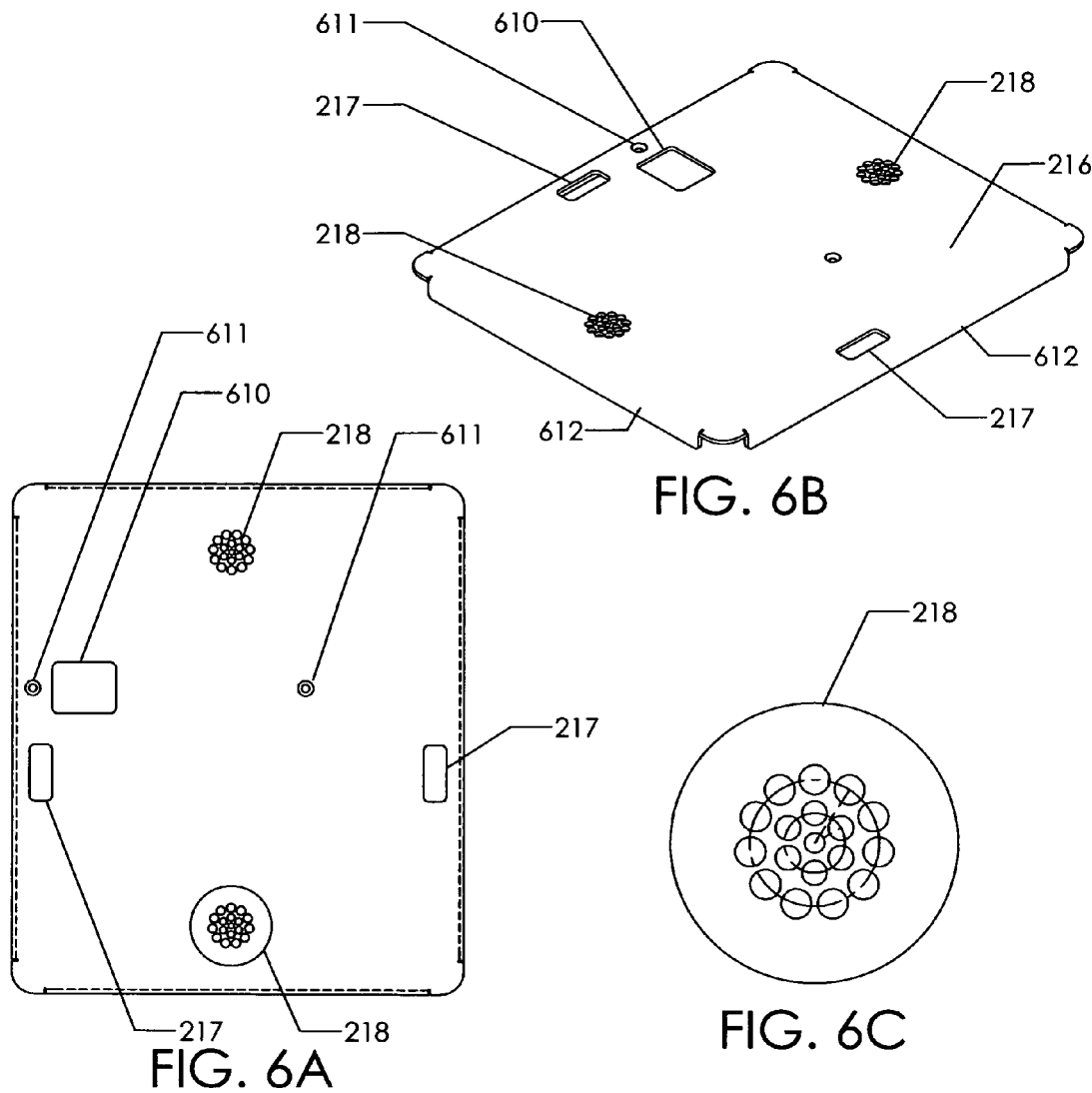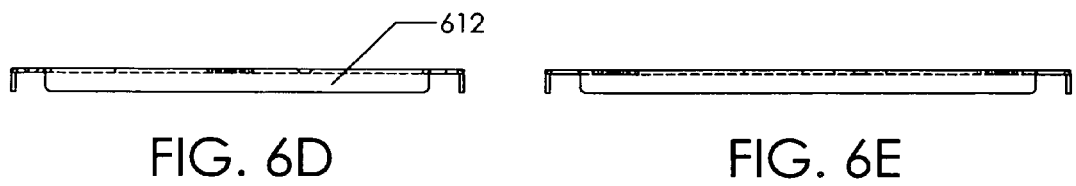

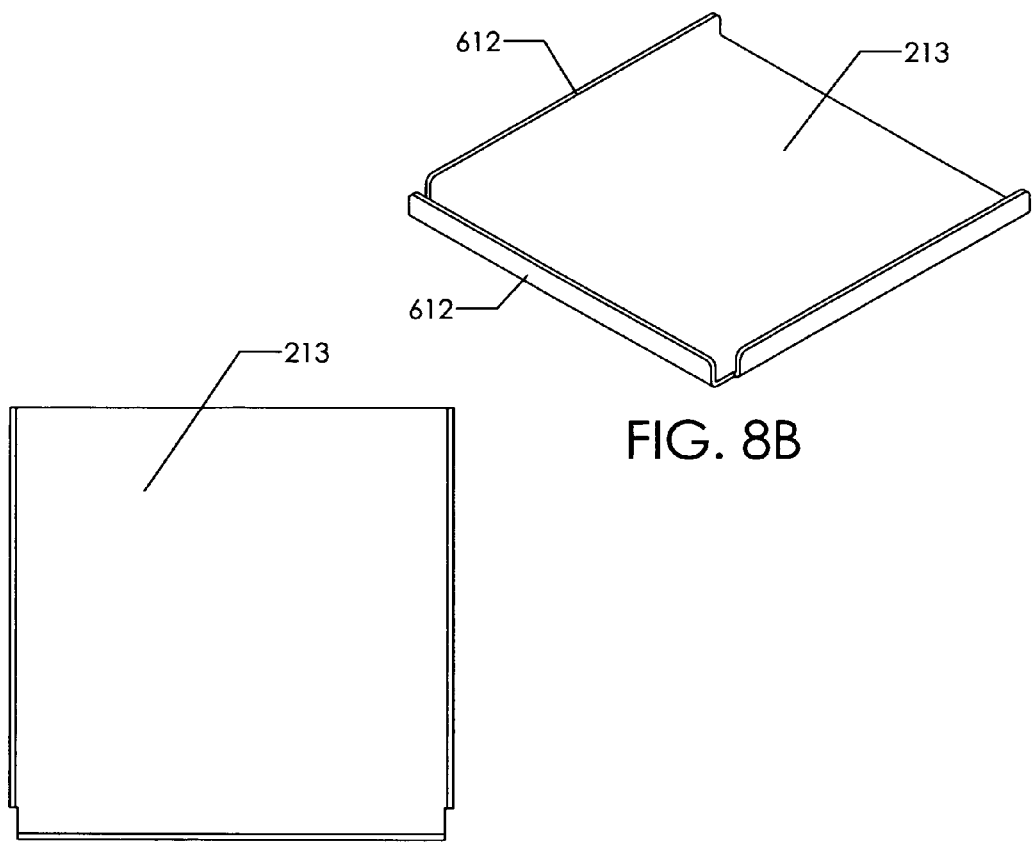
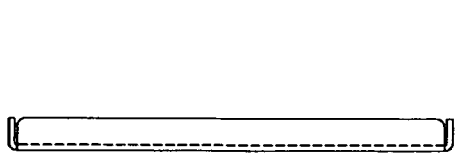
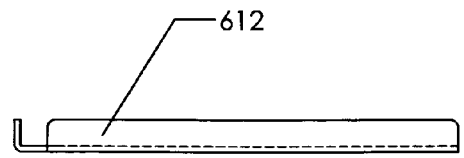

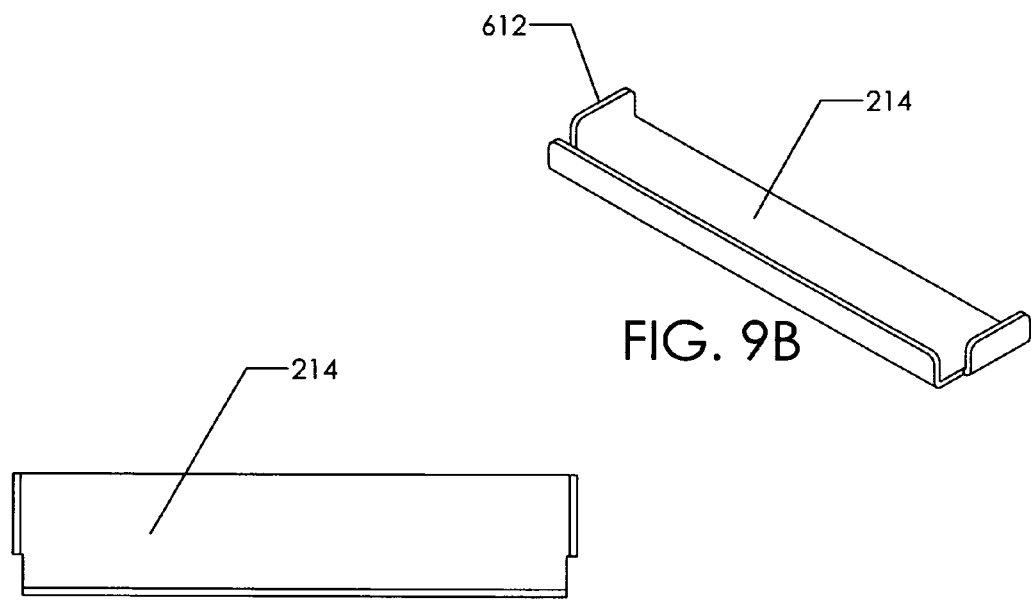
FIG. 9B
FIG. 9A
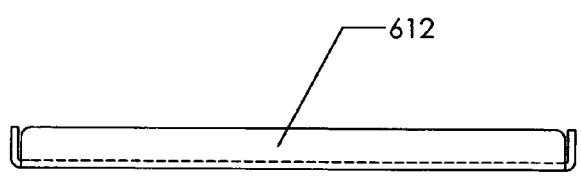
FIG. 9C
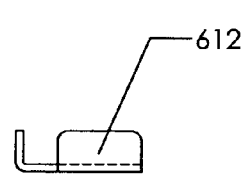
FIG. 9D

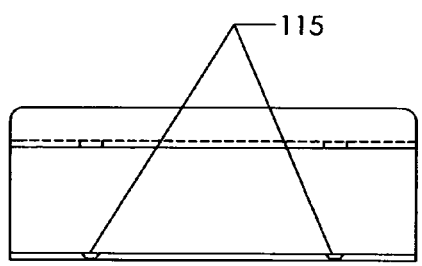
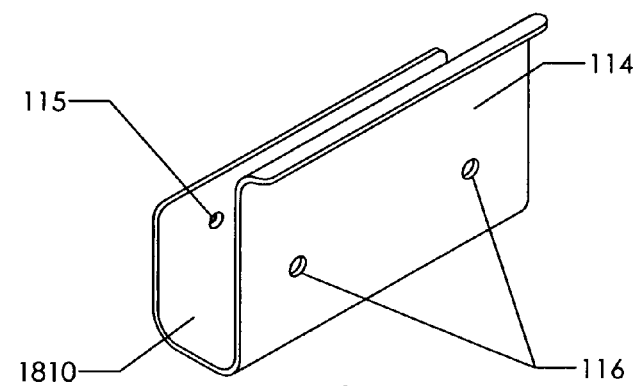
FIG. 13A    FIG. 13B
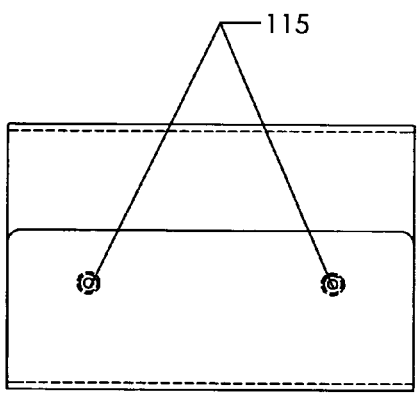
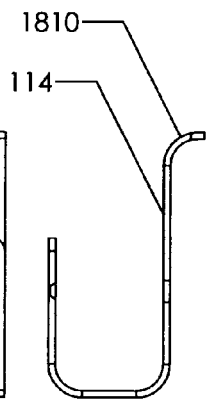
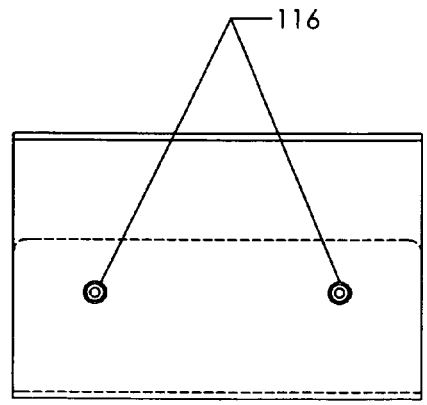
FIG. 13C    FIG. 13D    FIG. 13E

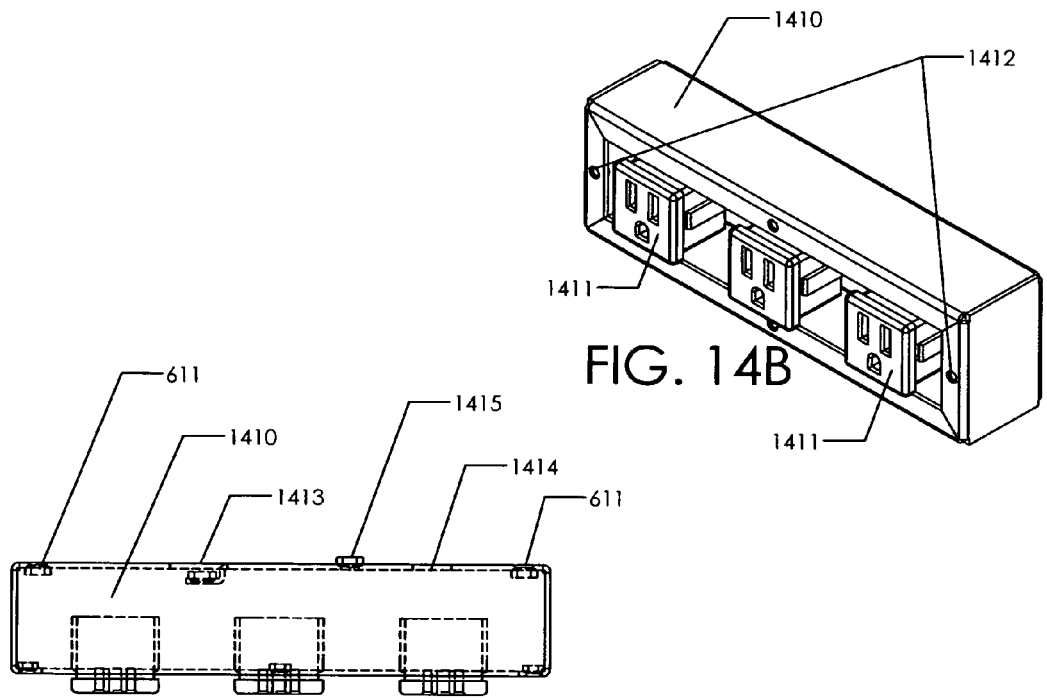
FIG. 14B
FIG. 14A
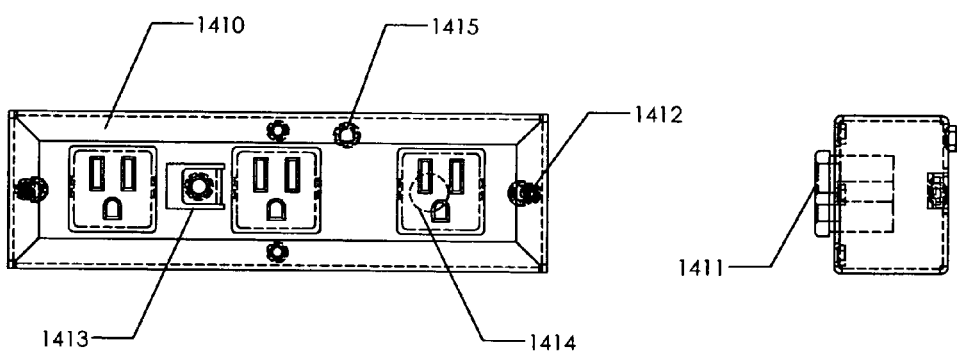
FIG. 14C
FIG. 14D

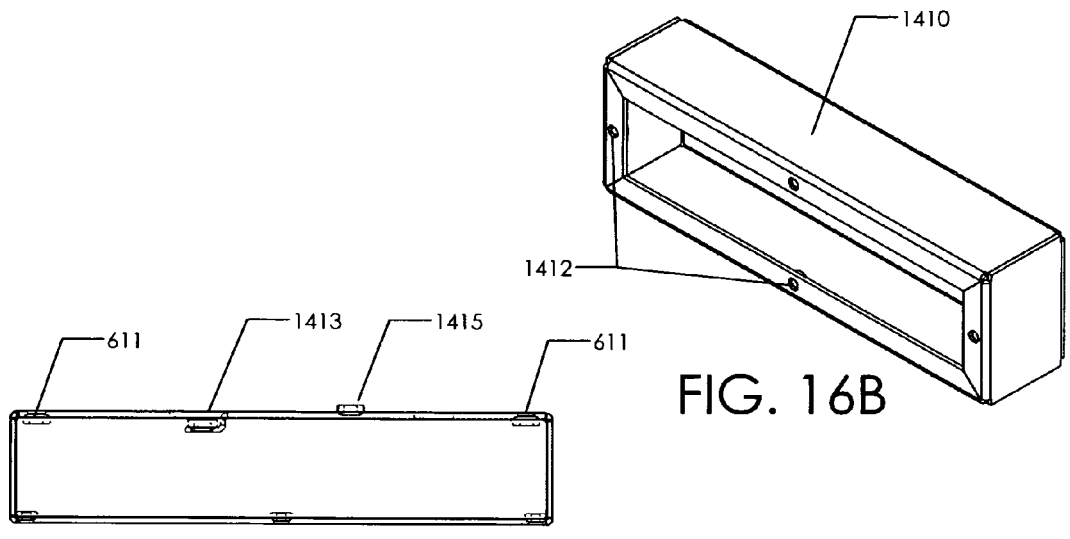
FIG. 16B
FIG. 16A
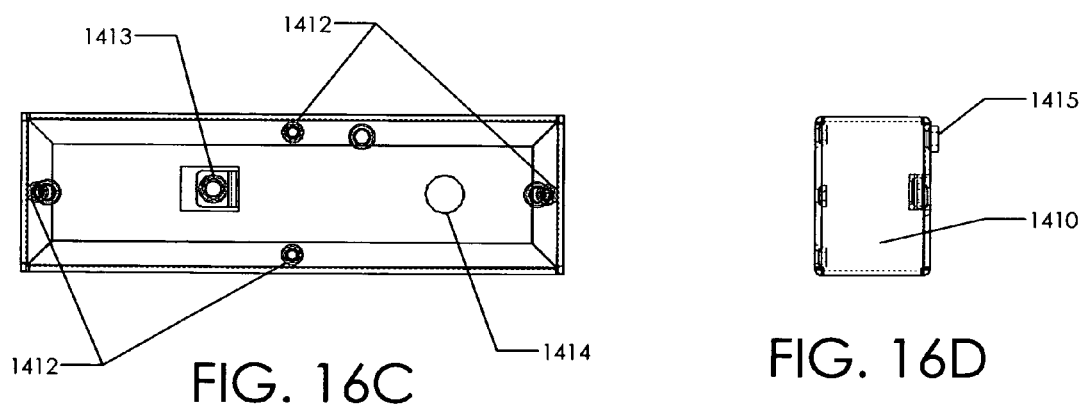
FIG. 16C
FIG. 16D

US 8,456,819 B1

PERSONAL STORAGE DEVICE WITH CHARGING CAPABILITY

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field

This application relates to personal storage units, specifically to small enclosures similar to a locker.

2. Prior Art

In workplace and community living environments there has long been a need to adequately safeguard personal valuables while one is away from the work or living space. In the workplace there may be a lockable desk drawer available for use but the space inside a drawer can be limited. There may also be a storage unit in a separate part of the building requiring valuables to be stored out of immediate reach and sight. In most community living environments, such as residence halls or barracks style buildings, there are few options to safely store small personal items of value, leaving them exposed and potentially subject to theft. Presently, there are commercially available "lockbox" type enclosures varying from inexpensive, plastic, and marginally protective file storage units, to quite expensive and heavy strong box or vault like units, most of which require either a power source to operate electronic locking devices or incorporate sophisticated lock and key systems. Some designs require mounting between wall studs which is problematic in a public building.

While there are a variety of small portable enclosures available that are lockable, these are still subject to theft due to the fact that their general size allows for the units themselves to be removed from the work or living space. The enclosure described in this application can be secured to non-removable surfaces, such as a desk or bookshelf, which currently exist in work and community living spaces thus eliminating the threat of either valuable items or the unit itself from being carried away.

Due to the increased prevalence of valuable personal electronic devices, there is now a heightened need for their safe storage as well as the need to recharge these items while keeping them secure in the process.

The purpose of this application is to introduce an article of manufacture which provides a convenient location for the simultaneous safe storage of various personal items and an internal charging capability for electronic devices. Inside this embodiment is an electrical power supply unit that allows for recharging of personal electronic devices while they are stored inside the unit. This embodiment requires no electrical power to function properly as a storage device yet it provides power for other electrical devices to be charged.

Furthermore, most small storage enclosures consist of a single space inside in which to store the items placed within them. This embodiment includes vertical and horizontal partitions so that items need not be stored one on top of the other, thus reducing the potential for damage to items while they are being stored. The horizontal surfaces also have an applied non-abrasive, non-slip protective surface to further reduce the potential for scratching or marring of valuable items stored inside.

This embodiment also has an internal mechanism allowing for the securing of items that are too large to be stored inside, such as but not limited to, a laptop computer, via any readily available cable lock, thus providing an element of external security as well.

While individual examples of prior art may exist which include a single feature described above, the novelty of this invention is that it provides an integrated array of features not currently available from any other personal storage device. These and other advantages will become more apparent from a consideration of the ensuing description and accompanying drawings.

SUMMARY

In accordance with one embodiment, this application describes a personal storage unit that may be used in communal spaces, providing security for valuables and simultaneously allowing for the charging of personal electronic devices stored within it.

DRAWINGS

FIG. 1 is a multisided view of the enclosure with the door closed.

FIG. 2 is multisided view of the enclosure showing all parts, minus the cosmetic cover and the electrical chassis, in their fully assembled positions.

FIG. 3 is a multi-sided view of the enclosure main body.

FIG. 5 is a multi-sided view of the cosmetic door cover.

FIG. 6 is a multi-sided view of the enclosure rear panel.

FIG. 8 is a multi-sided view of the internal top horizontal partition.

FIG. 9 is a multi-sided view of the internal middle horizontal partition.

FIG. 13 is a multi-sided view of the external laptop holder.

FIG. 14 is a multi-sided view of internal outlet chassis assembly.

FIG. 16 is a multi-sided view of the outlet chassis.

REFERENCE NUMERALS

Figure 4B:
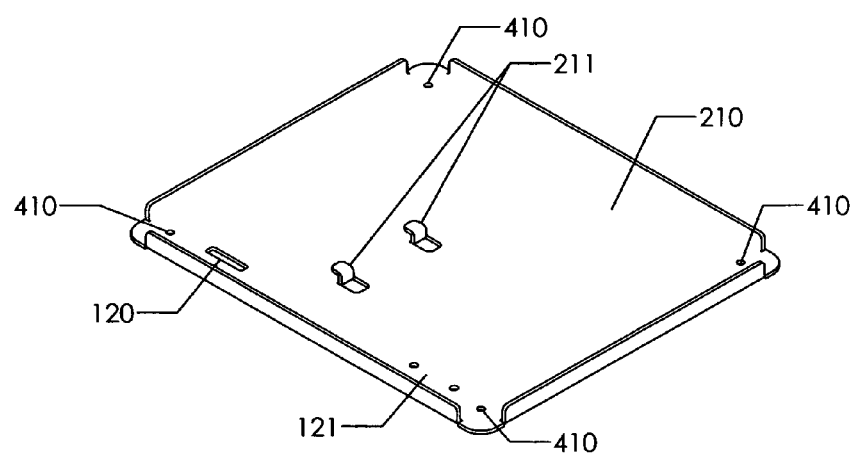
FIG. 4 is a multi-sided view of the access door panel.

110. Main Body
111. Main Body Side Mounting Holes
113. Cosmetic Door Cover
114. Laptop Holder
115. Laptop Holder Mounting Holes
116. Laptop Holder Access Holes
117. Door Hinge Top
118. Door Hinge Bottom
119. Lock Tab 120. Lock Tab Slot
121. Door Handle Mounting Holes
122. Logo Design
210. Access Door Panel
211. Access Door Panel Storage Hooks
212. Vertical Partition
213. Top Horizontal Partition
214. Middle Horizontal Partition
215. Bottom Horizontal Partition
216. Rear Panel
217. Rear Panel Cutouts
218. Rear Panel Vent Holes
219. Lock Tab Hole
312. Main Body Underside Mounting Hole
410. Cosmetic Door Cover Mounting Holes
411. Door Magnet Strike Plate Mount
510. Door Hinge Recess
610. Rear Panel Electrical Cutout
611. Rear Panel Electrical Chassis Mounting Holes
612. Assembly Flange
710. Vertical Partition Access Hole
1110. Lock Tab/Door Strike Plate Surface
1111. Lock Tab Magnet Mounting Hole
1210. Accessory Clip
1211. Accessory Clip Mounting Hole
1212. Accessory Clip Access Hole
1410. Outlet Chassis
1411. Outlets
1412. Outlet Cover Mounting Holes
1413. Outlet Chassis Grounding Tab
1414. Outlet Chassis Cord Exit Hole
1415. Power Cord Retention Clip Mount
1510. Outlet Cover
1511. Outlet Mounting Cutout
1710. Electrical Cord
1810. Non-abrasive Shelf Material

DETAILED DESCRIPTION

First Embodiment—FIGS. 1-18

FIG. 1 shows multi-sided views of a complete enclosure with a door in the closed position. The enclosure is comprised of a main body or wrap 110, an access door with a cosmetic cover 113 which are attached to the main body by a hinge 117, 118. The main body includes two main body side-mounting holes 111. Attached to one side of the main body is a laptop holder 114, which is mounted to the main body by mounting holes 115 and tool access holes 116. A lock tab 119 protrudes through a lock tab slot 120 in the cosmetic door cover. The lock tab is fixed to the inner surface of the main body. Door handle mounting holes 121 are located in the lower right corner of the cosmetic cover. Finally, in the upper left corner of the cosmetic door cover is an area for a logo design 122.

FIG. 2 is a multi-sided view of the enclosure assembly with all parts of similar material shown in the fully assembled position. An access door panel 210 is hingedly attached 117, 118 to the main body 110 and includes storage hooks 211 on the backside of the door. Inside the enclosure is a vertical partition 212, a top 213, middle 214, and bottom 215 horizontal partition fixed to the inner surfaces of the main body 110. A rear panel 216 is attached to the main body and all interior partitions. Included in the rear panel are two cutouts 217 and two vent holes 218. Additionally, a lock tab hole 219 is shown in the lock tab 119 of FIG. 2G. FIG. 2C shows the relationship between the main body 110, the door hinge 117, and the access door panel 210.

FIG. 3 is a multi-sided view of the main body 110 of the enclosure. Illustrated are the two main body side-mounting holes 111 and the laptop holder mounting holes 115. In FIG. 3A, a main body underside mounting hole 312 is shown.

Figure 4A:
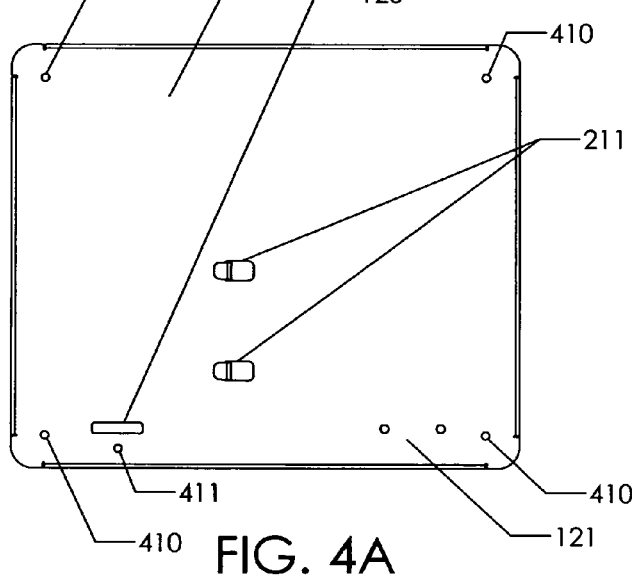
Figures 4C, 4D:
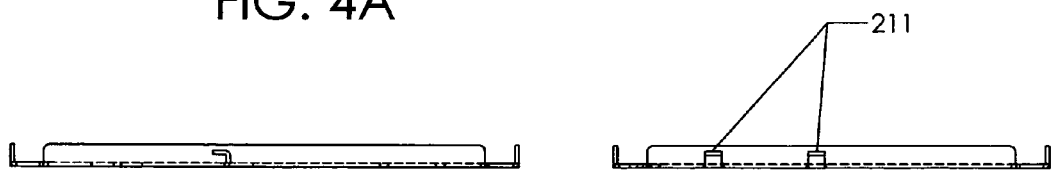

FIG. 4 is a multi-sided view of the access door panel 210. In each corner of the access door panel is a cosmetic cover 113 mounting hole 410. Also shown are expanded views of the accessory door panel hooks 211, the lock tab slot 120, and the door handle mounting holes 121.

FIG. 5 is a multi-sided view of the cosmetic door cover 113. FIG. 5A shows the cosmetic door cover mounting holes 410 which mate to the mounting holes 410 of the access door panel 210 of FIG. 4. Also illustrated are the lock tab slot 120, the door handle mounting holes 121, and the logo design area 122. FIG. 5C shows a magnified view of the cosmetic door cover hinge recess 510.

FIG. 6 shows the detail of the rear panel 216. Included in this illustration are the two rear panel cutouts 217, in addition to two vent holes 218, an electrical cutout 610, and two rear panel electrical chassis mounting holes 611. Attachment flanges 612 are also illustrated.

Figures 7A, 7B, 7C, 7D:
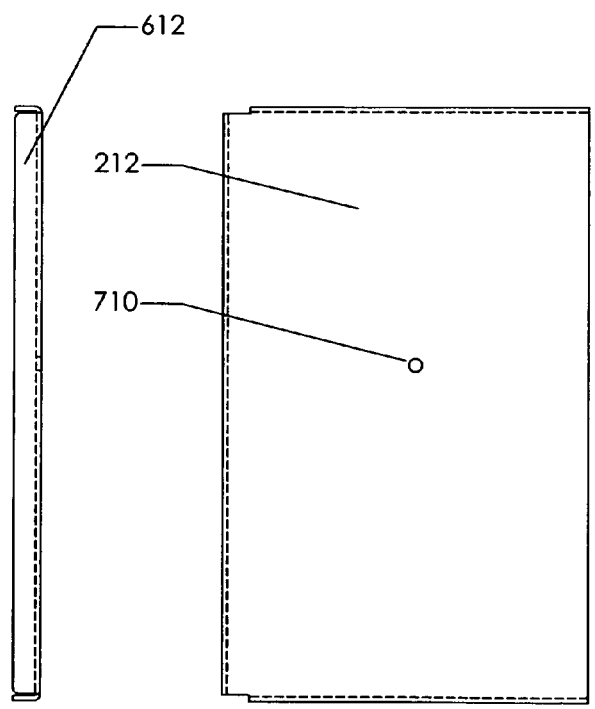
FIG. 7 is a multi-sided view of the internal vertical partition.

FIG. 7 shows the vertical partition 212 of the enclosure including an access hole 710.

FIG. 8 shows the top horizontal partition of the enclosure 213.

FIG. 9 shows the middle horizontal partition of the enclosure 214.

Figure 10B:
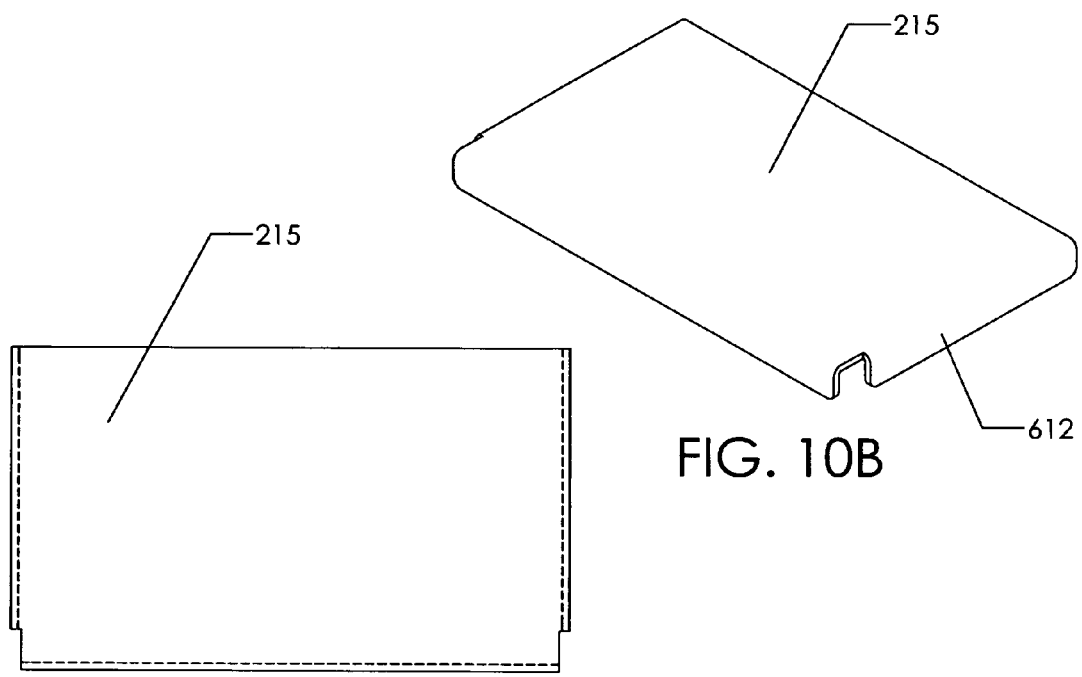
FIG. 10 is a multi-sided view of the internal bottom horizontal partition.
Figure 10A:
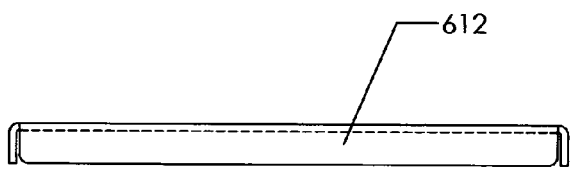
Figures 10C, 10D:
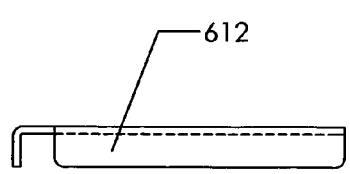
Figure 11A:
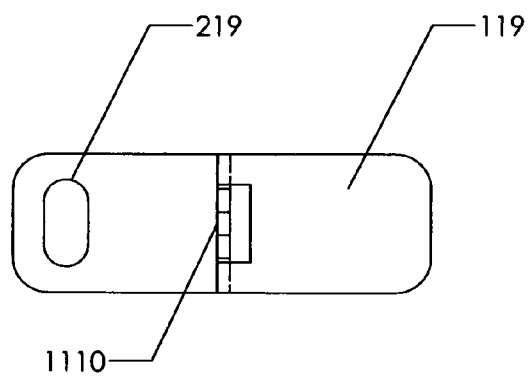
FIG. 11 is a multi-sided view of the internal lock tab.
Figure 11B:
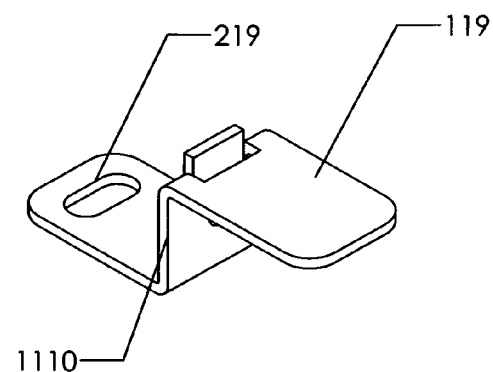
Figure 11C:
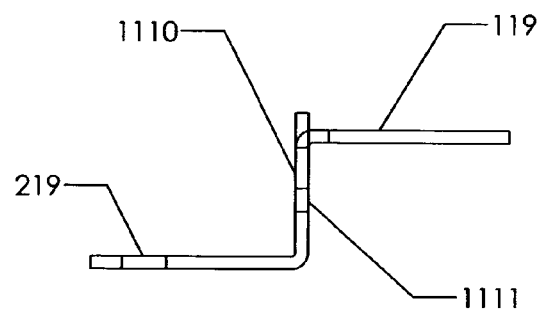
Figure 11D:
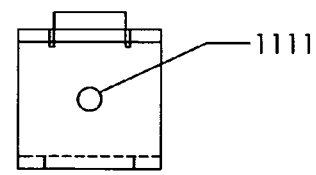
Figure 12A:
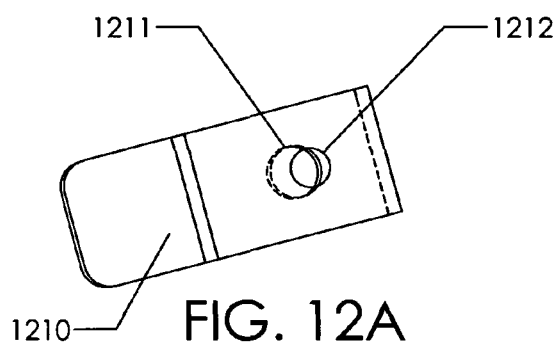
FIG. 12 is a multi-sided view of the internal accessory clip.
Figure 12B:
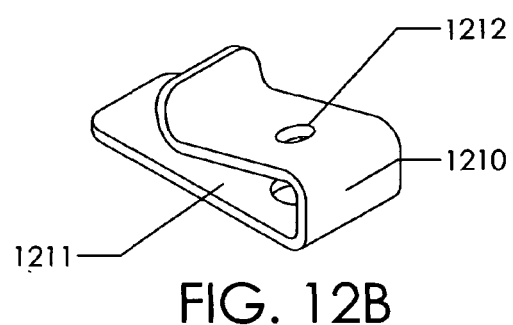
Figure 12C:
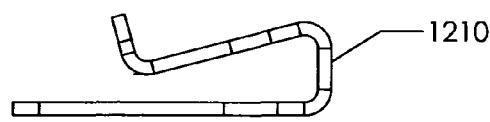
Figure 12D:
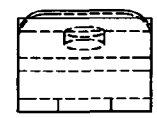
Figure 12E:
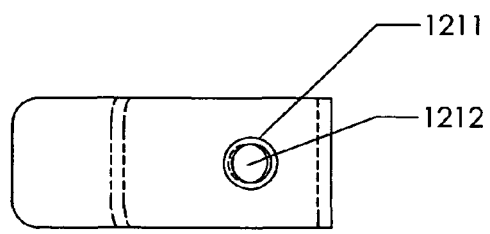
Figure 15B:
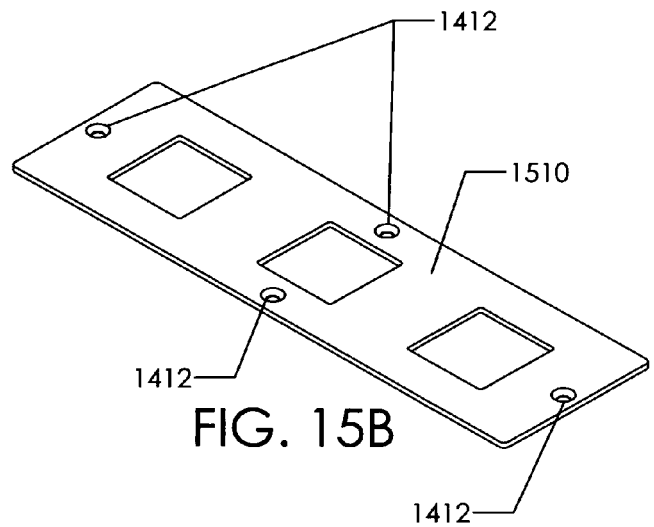
FIG. 15 is a multi-sided view of the outlet cover.
Figure 15A:
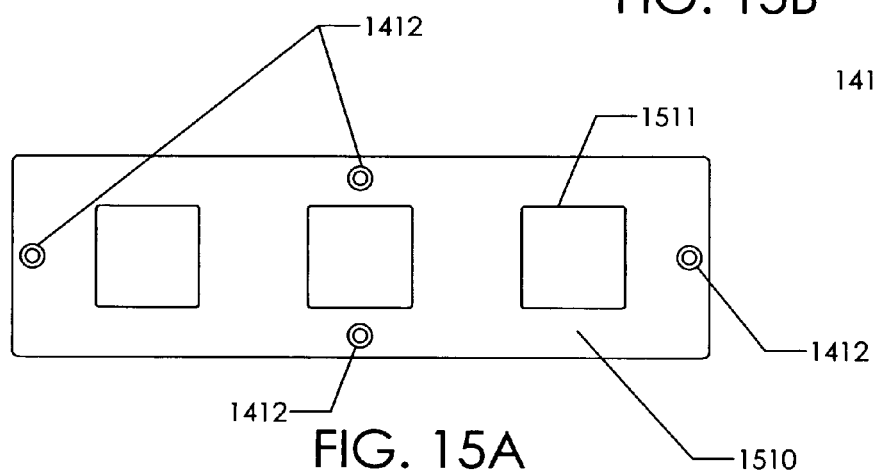
Figure 15C:
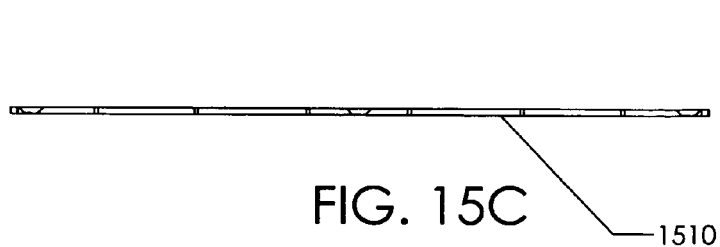
Figure 15D:
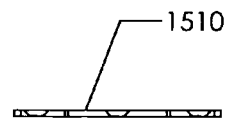

FIG. 10 shows the bottom horizontal partition of the enclosure 215.

FIG. 11 shows the lock tab feature 119 of the enclosure. Also illustrated are the lock tab hole 219, the lock tab/door strike plate surface 1110, and the lock tab magnet mounting hole 1111.

FIG. 12 shows the accessory clip 1210 which is mounted to the inner surface of the main body 110 at either side mounting hole 111. The accessory clip consists of a single piece of material with a mounting hole 1211 and a tool access hole 1212.

FIG. 13 shows multi-sided views of the laptop holder 114. Included are two laptop holder mounting holes 115 and two tool accessory holes 116.

FIG. 14 shows multi-sided views of a self-contained unit or outlet chassis assembly 1410, which is mounted to the rear panel 216 of FIG. 2. The unit fits between the top and middle horizontal partitions 213, 214 and is fixed to the rear panel by mounting holes 611. Electrical outlets 1411 are installed in the chassis assembly which also includes outlet cover mounting holes 1412, a grounding tab feature 1413, an electrical cord exit hole 1414, and a power cord retention clip mount 1415.

FIG. 15 shows an outlet cover 1510 which attaches to the face of the outlet chassis assembly 1410 of FIG. 14 by mated mounting holes 1412.

FIG. 16 shows multi-sided views of the outlet chassis 1410 minus all interior parts. Illustrated are the outlet cover mounting holes 1412, the outlet chassis to rear panel mounting holes 611, the electrical grounding tab 1413, the power cord exit hole 1414, and the power cord retention clip mounting hole 1415.

Figure 17:
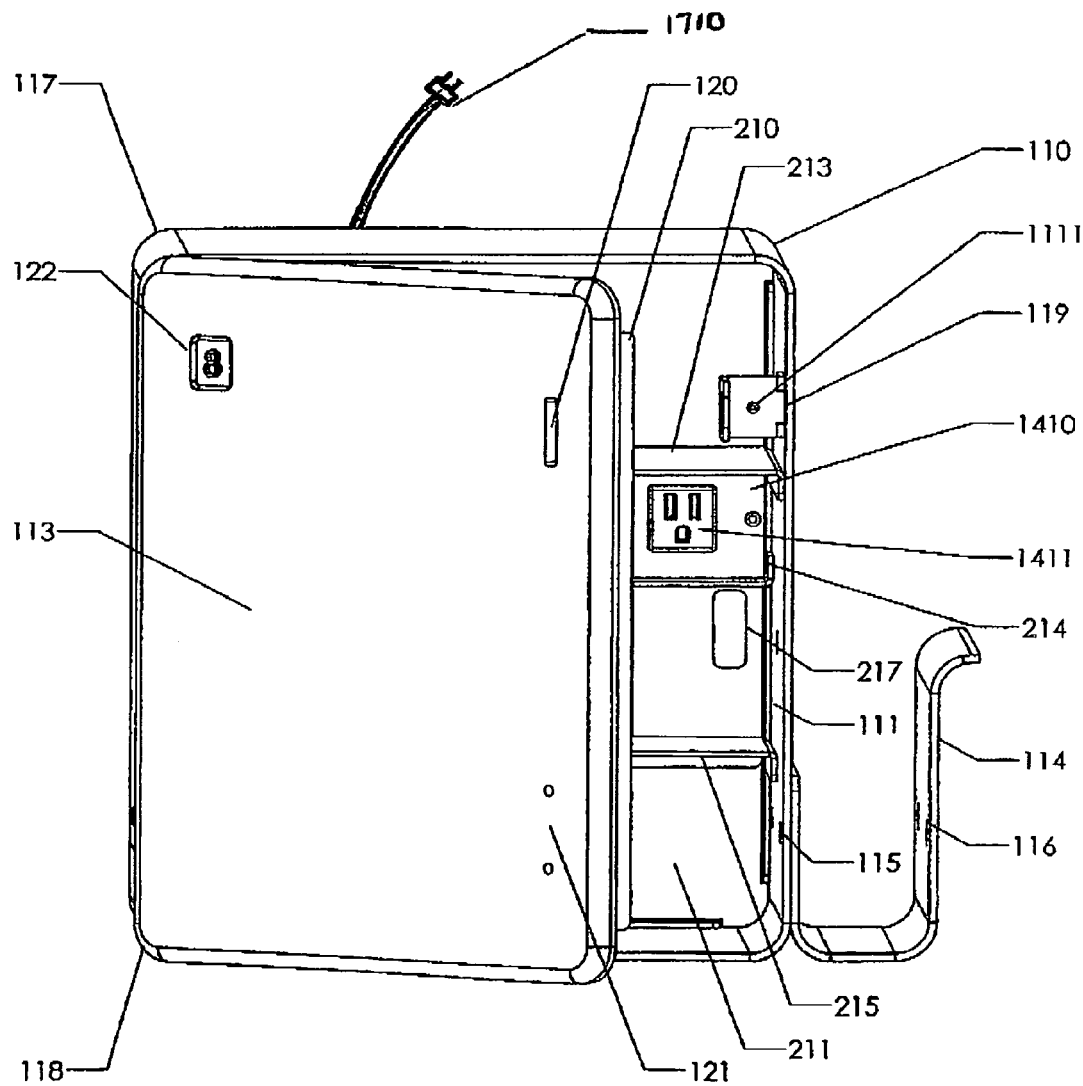
FIG. 17 is a front view of the enclosure assembly with the door partially open.

FIG. 17 shows the fully assembled enclosure with the door partially open. This illustration demonstrates the connected relationship of all parts shown. The main body 110 has the access door panel 210 and the cosmetic door cover 113 hingedly attached 117, 118. The interior of the enclosure shows the rear panel 211 with cutout 217. The top 213, middle 214, and bottom 215 horizontal partitions are in place with the outlet chassis assembly 1410 between the top and middle partitions. On the inner surface of the main body 110 are the side mounting hole 111 and the lock tab 119 shown in place and aligned with the lock tab slot 120. The laptop holder 114 is attached to one side of the main body by use of mounting holes 115 and tool access holes 116.

The cosmetic door cover 113 is attached to the access door panel with the door handle mounting holes 121 and logo design 122 shown.

Figure 18:
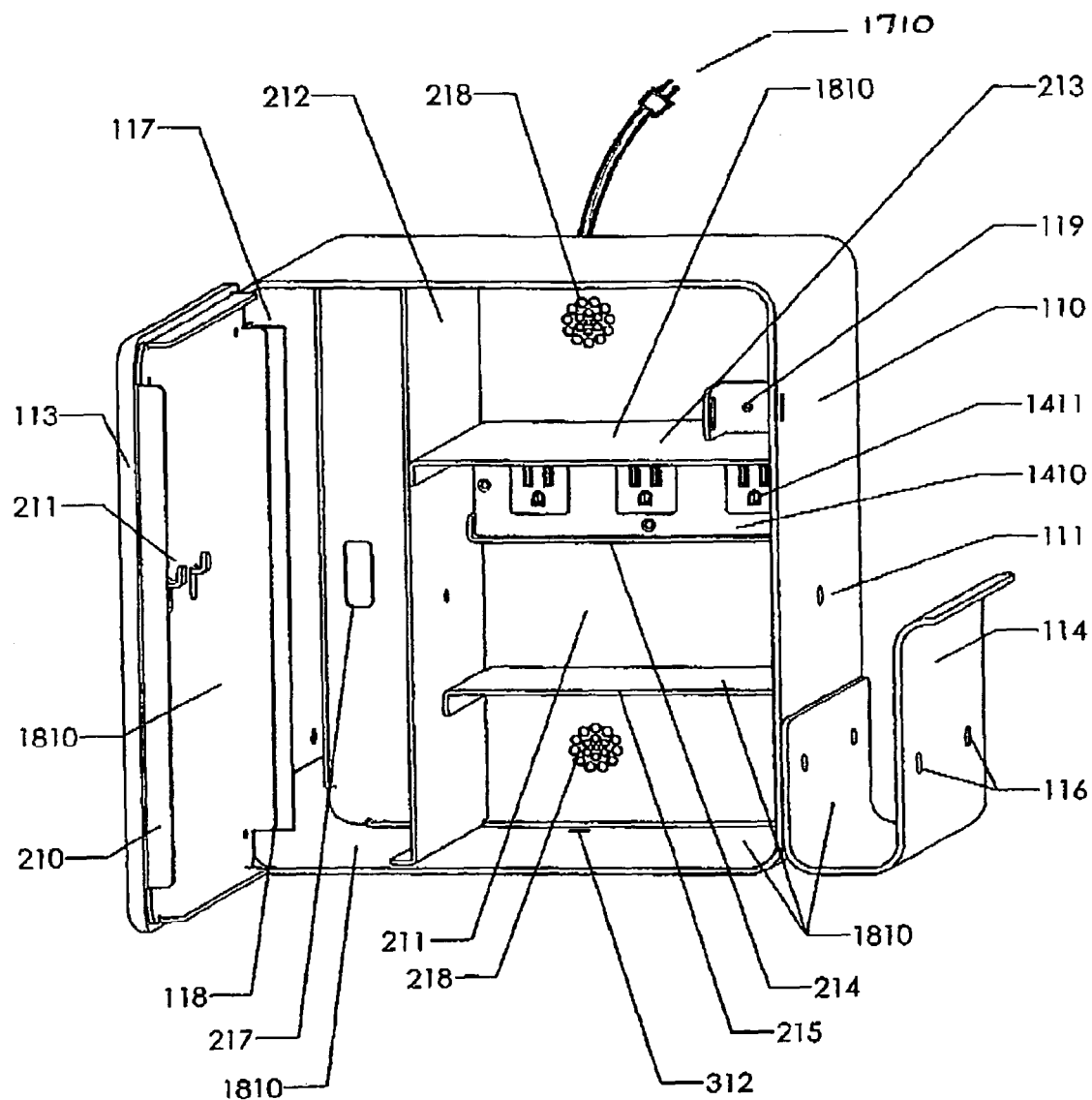
FIG. 18 is a front view of the enclosure assembly with the door fully open.

FIG. 18 shows the fully assembled enclosure with the door fully open. In addition to the assembled part relationships illustrated in FIG. 17 this drawing shows both rear panel vent holes 218 and the left rear panel cutout 217. The vertical partition 212 is shown in relation to each horizontal partition and the main body. The main body underside mounting hole 312 and the access door panel storage hooks 211 are shown as well as a non-abrasive protective material as applied to selected inner and outer horizontal surfaces 1810.

FIGS. 1-18 show multiple mounting holes where parts such as the laptop holder FIG. 1, 114, the accessory clip FIG. 12, 1210, the outlet chassis FIG. 14, 1410, and the outlet cover FIG. 15, 1510 are designed to be attached to their respective mated part through the use of either standard or metric readily available screws, bolts, and nuts. The main body side mounting holes and underside mounting holes FIG. 3, 111, 312 incorporate a tamper-proof type nut such as a weld nut or similar.

Operation

First Embodiment—FIGS. 1-18

The personal storage unit of this first embodiment is designed to function as follows.

The main body FIG. 1, 110, the access door panel FIG. 2, 210, and the rear panel FIG. 6, 216 are made of a rigid material so that when assembled these parts form a structurally sound single unit for use in storing personal items interiorly. The access door is attached with a concealed hinge FIG. 1, 117, 118 and held in the unsecured closed position with a magnet and strike plate FIG. 11, 1110, 1111 and in the secured closed position by a lock tab FIG. 1, 119 and a personally supplied lock of choice. Attached exteriorly is a cosmetic door cover FIG. 1, 113 which is made of a rigid acrylic or similar material adding extra rigidity to the access door panel. Any cabinet style door handle can be attached using the associated mounting holes FIG. 1, 113. A cosmetic door cover allows for unlimited and unique color and design capability as well as inclusion of a logo if desired FIG. 5, 122. Also attached exteriorly is a laptop holder FIG. 1, 114 which allows the safe storage of a computer laptop when said laptop is connected to a commercially available laptop cable lock, one end of which is secured inside the storage unit through the use of the accessory clip FIG. 12, 1210. A laptop holder is only one possible attachment exteriorly affixed to the storage unit and it is not intended to limit the inclusion of other attachments which could be used to accommodate and secure additional items to the main body as well.

The main body of the storage unit is itself further secured to a non-removable surface in a living or workplace, such as a desk or shelf, by means of the side and underside mounting holes FIG. 3, 111, 312 which incorporate standard readily available tamper proof hardware such as weld nuts and mated hex drive screws. This feature prevents the unit itself from being subject to theft by being removed from its location.

Interiorly are vertical and horizontal partitions FIG. 18, 212, 213, 214, 215 which are attached to the main body, make up individual storage compartments. The rear panel FIG. 6, 216 contains two cutouts 217 which allow a cable lock to be inserted from the rear and attached to either side of the main body by means of the accessory clip FIG. 12, 1210. Furthermore, the rear panel contains mounting points 611 for the electrical chassis FIG. 14, 1410, two circular patterned holes FIG. 6, 218 which allow heat to be vented to the outside of the storage unit. Additionally there is a single cutout FIG. 6, 610 sized to allow an electrical plug to pass from the electrical chassis through the rear panel for use in a standard wall outlet.

The outlet chassis FIG. 14, 1410 is a fully enclosed electrical unit design to fit between the top and middle horizontal partitions FIG. 18, 213, 214 and to be mounted to the rear panel 211 of the storage enclosure. The electrical unit FIG. 18, 1410 allows personal electrical devices stored within the main enclosure to be charged while they are secured inside.

The interior side of the access door panel FIG. 4, 211 contains two hook features allowing articles such as, but not limited to, key chains to be hung from the door panel.

Interior horizontal surfaces are covered with a non-abrasive protective layer FIG. 18, 1810 to prevent marring or scratching of the materials stored inside the main unit. This embodiment uses an adhesive rubberlike material but other products similar in scope may be used. Portions of the vertical surfaces of both the access door panel FIG. 18, 210 and the laptop holder FIG. 13, 114 where contact is made between stored items and said door panel and laptop holder also contain the non-abrasive layer for protective purposes.

CONCLUSION, RAMIFICATION AND SCOPE

Thus the reader will see that at least one embodiment of this storage enclosure provides a lightweight, economical, and reliable device for the storage of personal articles in communal environments. The enclosure itself can be secured to a non-removable surface and it allows for larger items to be secured to the exterior of the enclosure as well. The enclosure also provides a charging capability for personal electronic devices stored inside. While the inventor primarily conceived the enclosure to be used in a college environment, it is conceivable that it could be used in almost any living space or workplace where one desires to safeguard personal items while away from said space. These environments include but are not limited to; residence halls, dormitories, barrack style living quarters, apartment buildings, office cubicles, and industrial work stations.

While the above description contains much specificity, this should not be construed as limitations on the scope, but rather as an exemplification of one preferred embodiment thereof. Many other variations are possible. For example, initially the enclosure was designed to fit on a bookshelf but the size and shape could be modified to fit other environmental restrictions. The exterior attachment in this embodiment is described as a laptop holder FIG. 1 114, however other attachments allowing items too large to fit within the enclosure to be exteriorly secured are possible. In the illustrated embodiment, the enclosure is specified to be made of a "rigid material" which may include metals, hard plastics, or other suitable materials. The means of venting specified could also be modified to include an electrical means, such as a fan, to assist in heat dissipation.

Accordingly, the scope should be determined not by the embodiment illustrated, but by the appended claims and their legal equivalents.

I claim:

1. An apparatus, comprising:
   a main body of a predetermined size and shape to accommodate storage of personal items, said main body including an enclosure defined by a rear wall surface, two side wall surfaces, a ceiling surface, a floor surface;

a plurality of interior horizontal and vertical partitions defined inside the enclosure, wherein the plurality of interior horizontal and vertical partitioned spaces include at least one vertically oriented rectangular partitioned space and a plurality of horizontally oriented rectangular partitioned spaces, and wherein the plurality of interior horizontal and vertical partitioned spaces include:

respective rear partition walls defined by respective portions of the rear wall surface of the enclosure, and respective cut-outs in the respective rear partition walls defining at least one cut-out per rear partition wall of the respective rear partition walls, enabling air passage in or out of each of the respective cut-outs;

a lockable hinged front access door movable between a locked closed position and an unlocked open position, wherein a plurality of hooks are included on an interior side of the lockable hinged front access door;

at least one electrical power source secured to at least one of the respective rear walls of the plurality of partitioned spaces for provision of power to a plurality of electrical devices;

at least one exterior U-shaped structure secured to an exterior of at least one of the two side wall surfaces, wherein the at least one exterior U-shaped structure is open at a top end to receive at least one object in a slot of a U-shaped structure of the at least one exterior U-shaped structure;

at least one retention device, same in number as the at least one exterior U-shaped structure, secured to or integral with at least one of the rear wall surface, the two side wall surfaces, the ceiling surface, or the floor surface, wherein for each of the at least one exterior U-shaped structure, a cut-out of the respective cut-outs is at a same or substantially same height as the at least one retention device to facilitate a securing of at least one object within the at least one exterior U-shaped structure with a cable lock inserted through the cut-out or around at least part of a retention device of the at least one retention device; and at least one side hole in at least one of the two side wall surfaces to enable securing of the enclosure to a separate stationary object via an elongated rigid member partly extending through the at least one side hole.

2. The apparatus of claim 1 further including a first means, including the at least one side hole, for tamper resistant mounting of said enclosure to the separate stationary object.

3. The apparatus of claim 1 further including a plurality of exterior attachments of predetermined sizes and shapes, including the at least one exterior U-shaped structure, whereby additional items may be secured outside said storage unit.

4. The apparatus of claim 1 further including at least one fan, whereby heat generated inside said enclosure is vented exteriorly in response to operation of the at least one fan.

5. The apparatus of claim 1, wherein the at least one retention device is secured to or integral with an interior of the enclosure to at least one of the rear wall surface, the two side wall surfaces, the ceiling surface, or the floor surface.

6. The apparatus of claim 1, wherein the at least one retention device is at least one clip.

7. The apparatus of claim 1, wherein the elongated rigid member partly extends through the at least one side hole.

8. An apparatus, comprising:

means for securely enclosing a space including at least a rear wall surface, two side wall surfaces, a ceiling surface, a floor surface;

means for horizontally and vertically partitioning an inside of the means for securely enclosing the space, wherein the means for horizontally and vertically partitioning includes means for vertically partitioning the inside of the means for securely enclosing the space with at least one vertically oriented rectangular partitioned space and means for horizontally partitioning the inside of the means for securely enclosing the space with a plurality of horizontally oriented rectangular partitioned spaces, and wherein each partitioned space defined by the means for horizontally partitioning and the means for vertically partitioning includes air passage means for enabling air passage in or out of the partitioned space;

hinged door means movable between a locked closed position and an unlocked open position;

a plurality of hook means for retaining hangable objects on an interior side of the hinged door means;

electrical power source means for providing power to a plurality of electrical devices, wherein the electrical power source means is secured inside a partitioned space defined by the means for horizontally partitioning and the means for vertically partitioning;

exterior U-shaped support means for receiving external objects via an open end of a U-shape of the exterior U-shaped support means defining a slot of a U-shaped structure of the exterior U-shaped support means, wherein the exterior U-shaped support means is secured to an exterior of at least one of the two side wall surfaces;

retention means, same in number as the exterior U-shaped support means, secured to or integral with at least one of the rear wall surface, the two side wall surfaces, the ceiling surface, or the floor surface, wherein, for each of the exterior U-shaped support means, the air passage means is at a same or substantially same height as the retention means to facilitate a securing of an external object within the slot of the exterior U-shaped support means with lock means insertable through the air passage means or around at least part of the retention means; and attachment means in at least one of the two side wall surfaces for securing the apparatus to an external stationary object.

* * * * *